United States Patent Office 3,402,135
Patented Sept. 17, 1968

3,402,135
URETHANE CRUDE PROCESSING AID
Joseph L. Schwartz, Philadelphia, and Harold L. Elkin, Levittown, Pa., assignors to Thiokol Chemical Corporation, Bristol, Pa., a corporation of Delaware
No Drawing. Continuation of application Ser. No. 589,164, Oct. 24, 1966, which is a continuation of application Ser. No. 187,956, Apr. 24, 1962. This application May 12, 1967, Ser. No. 638,157
11 Claims. (Cl. 260—22)

ABSTRACT OF THE DISCLOSURE

Tough urethane crude rubbers are rendered millable by the use therein of fatty acids.

---

This application is a continuation of application Serial No. 589,164 filed October 24, 1966, now abandoned, which was a continuation of Serial No. 187,956 filed April 24, 1962, now abandoned.

The present invention relates to a novel processing aid for urethane crude rubbers. More particularly the present invention relates to the use of fatty acids to substantially improve the processibility of urethane crude rubbers.

The object of the present invention is to provide a novel processing aid which will improve the processing characteristics of urethane crudes without significantly affecting the properties thereof.

In the fabrication of urethane crudes many are prepared which have limited, or no, practical utility because of the relative toughness of the material. A tough crude, within the meaning of the present invention, is one having a Mooney viscosity value in excess of 120 under test conditions ML 4 at 212° F. Crudes which are relatively easy to process under these test conditions are those having a Mooney viscosity of about 35±15. In order to compound a urethane crude with the vulcanizing agents, accelerators, fillers, stabilizers, etc., needed to prepare a useful product therefrom, it is necessary for example, to mill the crude on a rubber milling machine in order to place the crude in a physical condition in which it is more receptive to the facile and even dispersion of the adjuvant materials therein. When the crude is a relatively tough material, the milling time needed to band the crude, i.e., the time needed to properly prepare the crude for the reception of the other compounding materials, is prohibitively long for economic and technical reasons. Attempts have been made by those in the art to improve the processability of the relatively tougher crude urethane materials by incorporating in the crude, either while or after the crude is being made, plasticizers such as beeswax as disclosed in U.S. 2,844,554. The amounts of these materials which are needed to impart good processing qualities to the crude materials are of such a magnitude, however, that the resulting products are rendered too soft for a great many commercial uses. Attempts to use stearic acid and like materials, by those in the art, to improve the processing characteristics of urethane crudes has not been successful to date (U.S. 2,844,554).

It has now been unexpectedly found that the processing characteristics of urethane crudes can be substantially improved without significantly affecting the properties of the products produced therefrom if an aliphatic fatty acid is incorporated therein as a processing acid. By the term aliphatic fatty acid, as used in connection with the present invention, it is meant a straight chained aliphatic fatty acid containing approximately 6 to 25 carbon atoms. The fatty acids may be solids or liquid and may be saturated or unsaturated. Stearic acid is the preferred of these processing acids because of its additional value as a lubricant. About 0.1 to 2.0 and preferably 0.5 to 1.0 parts by weight of the processing aids of the present invention are used per hundred parts by weight of the urethane crude being treated therewith. These quantities of processing aids are based on a crude prepared from a prepolymer having an —NCO content of approximately 3%. As the —NCO content of the prepolymer from which the crude is prepared decreases or increases from 3%, proportionally larger or smaller, respectively, amounts of the processing aids are needed to impart the same effect to the crude. The processing aids are preferably added to the crude during the preparation thereof. They may be added to the crude during the milling or mixing thereof but they are not as effective when used under these conditions and such a procedure requires the use of two to three times as much of the processing aid to obtain the same processing effect. The use of higher amounts of the processing aids, moreover, results in the preparation of correspondingly softer materials. Materials that are too soft have limited, if any, commercial utility.

It has also been unexpectedly found that the use of the fatty acid processing aids of the present invention, allows a urethane crude to be banded on production size mills within 15 seconds to 3 minutes, depending on the Mooney viscosity of the finished product, whereas the same crudes processed without these processing aids would require about 15 to 45 minutes' milling time before banding thereof would be effected. The use of these processing aids, therefore, substantially reduces the heat history of the crudes treated therewith. The use of the processing aids of the present invention, moreover, produces the ease of processing effect without significantly affecting the properties of the resulting product which cannot be readily done when other materials known to the art have been used for this purpose, such as plasticizers and rubber peptizers.

The use of the processing aids of the present invention, furthermore, allows for a control of the Mooney viscosity of the finished product as a function of the processing aid content thereof with the —NCO/additive hydrogen ratio of the product also taken into consideration. Generally, as the —NCO/active hydrogen ratio increases it is necessary to increase the amount of the processing aid needed to obtain the same effect. The processing aid apparently helps in breaking down the polymer during the banding or mixing thereof. Another advantage of the present invention is that it allows the urethane crude to be compounded on a hot mill which has decided technical advantages, for some applications, over cold milling. Because of the lubricating features of the processing aids of the present invention, moreover, there is relatively little, if any, adhesion or sticking of the crude to the mill or mixer during the milling or mixing thereof.

As noted above, it is preferable that the processing aid be incorporated into the crude as the crude is being made. Once the crude is made the processing aid can only be effectively incorporated therein if the crude is first banded on the mill, which procedure would substantially nullify the use of a processing aid at all.

The use of the processing aids of the present invention also results in a substantial lessening in the time needed on the mill to cause the disappearance of laciness in the crude, i.e., the disappearance of hollow pockets in the banded polymer. The presence of such pockets tends to prevent an even distribution of adjuvants into the banding crude and compounding of the crude with fillers, vulcanizing agents, etc., is usually held up until the laciness in a crude has disappeared.

The urethane crudes which may be treated with the processing aids of the present invention may be of the polyester, polyether or mixed polyester-polyether types and they may be of the sulfur or peroxide curable varieties thereof.

As noted above, the processing aids of the present invention are preferably incorporated into the urethane crudes to be treated therewith during the preparation of the crude. The fatty acid processing aid may be incorporated into the crude during any step in the preparaof the batches of crude prepared was about 1,000 grams. The crudes were prepared from prepolymers containing various levels of NCO content at an NCO/OH ratio of 1.025 with various quantities of stearic acid. The physical properties and processability characteristics of the crudes thus prepared are shown below. In milling the crudes a laboratory sized mill was used.

| Crude No. | Stearic Acid Content of Crude | Percent NCO in Prepolymer | Processability of the Crude | Mooney Viscosity of the Crude ML4 (212° F.) | | Mooney Scorch Values of Crude, 10 Pt. Rise at 250° F., Minutes | Stress-Strain Characteristics of the Crude (45'/287° F.) | | | | | | | |
|---|---|---|---|---|---|---|---|---|---|---|---|---|---|---|
| | | | | Age (days) | Value | | Modulus, p.s.i. | | | TS, p.s.i. | E, percent | Duro "A" | TR, p.l.i. | PS, percent |
| | | | | | | | 200% | 300% | 500% | | | | | |
| 1 | None | 2.69 | Very lacy, tough | 1 | 200+ | | | | | | | | | |
| 2 | 0.05 | 2.69 | ___do___ | 1 | 196 | | | | | | | | | |
| 3 | 0.25 | 2.69 | Lacy (3 min.) | 1 | 104 | | | | | | | | | |
| | | | Very lacy, tough | 8 | 132 | | | | | | | | | |
| | | | ___do___ | 15 | 138 | | | | | | | | | |
| 4 | 0.75 | 2.69 | Lacy (2 min.), difficult to process | 1 | 46 | 18 | 480 | 815 | 2,635 | 3,750 | 585 | 67 | 245 | 23.4 |
| | | | Lacy (3 min.), difficult to process | 8 | 72 | | | | | | | | | |
| | | | ___do___ | 15 | 72 | | | | | | | | | |
| 5 | None | 3.03 | Very lacy, tough | 1 | 168 | | | | | | | | | |
| | | | | 8 | 200+ | | | | | | | | | |
| 6 | 0.05 | 3.03 | Lacy (4 min.) | 1 | 184 | | | | | | | | | |
| | | | Very lacy, tough | 8 | 200+ | | | | | | | | | |
| 7 | 0.25 | 3.03 | Lacy (2 min.), easy to process | 1 | 46 | | | | | | | | | |
| | | | Lacy (3 min.), difficult to process | 8 | 98 | | | | | | | | | |
| | | | ___do___ | 15 | 82 | | | | | | | | | |
| | | | ___do___ | 22 | 94 | | | | | | | | | |
| 8 | 0.75 | 3.03 | No laciness, easy to process | 1 | 24 | 27 | 320 | 555 | 1,885 | 4,030 | 675 | 65 | 365 | 26.5 |
| | | | ___do___ | 8 | 30 | | | | | | | | | |
| | | | Lacy (2 min.), fairly easy to process | 15 | 42 | | | | | | | | | |
| 9 | None | 3.69 | Very lacy, tough | 1 | 200+ | 17 | 665 | 845 | 4,090 | 4,580 | 540 | 68 | 255 | 15.6 |
| 10 | 0.05 | 3.69 | ___do___ | 1 | 200+ | | | | | | | | | |
| 11 | 0.15 | 3.69 | Lacy (3 min.), fairly difficult to process | 1 | 130 | | | | | | | | | |
| | | | | 8 | 150 | | | | | | | | | |
| | | | | 15 | 102 | | | | | | | | | |
| 12 | 0.025 | 3.69 | Lacy (2 min.), easy to process | 1 | 56 | 28 | 515 | 980 | 3,295 | 3,810 | 535 | 69 | 285 | 21.8 |
| | | | | 8 | 62 | | | | | | | | | |
| | | | | 15 | 50 | | | | | | | | | |
| 13 | 0.50 | 3.69 | Lacy (1 min.), easy to process | 1 | 28 | 31 | 460 | 610 | 3,400 | 4,480 | 565 | 70 | 240 | 20.2 |
| | | | | 8 | 32 | | | | | | | | | |
| | | | | 15 | 26 | | | | | | | | | |
| 14 | 0.75 | 3.69 | No laciness, easy to process | 1 | 22 | 31 | 615 | 1,115 | 3,475 | 4,910 | 590 | 70 | 270 | 26.5 |
| | | | | 8 | 20 | | | | | | | | | |
| | | | | 15 | | | | | | | | | | |

NOTE.—p.s.i.=lbs. per square inch; TS=Tensile strength; E=Elongation; TR=Tear resistance; PS=Permanent set. The time required for laciness to disappear from banding stock is shown in parentheses.

tion thereof. If the processing aid is added while there is still free diisocyanate present in the reaction mixture sufficient amounts of the fatty acid should be added so as to compensate for the small amount of the processing aid that will react with the diisocyanate.

The following examples are merely illustrative of the present invention and are not intended as a limitation upon the scope thereof.

EXAMPLE 1

The use of stearic acid as a processing aid according to the teachings of the present invention is illustrated in this example. The various urethane crudes treated with this processing aid were ethylene-propylene adipate/toluene diisocyanate/glycerol alpha allyl ether reaction products. In preparing these reaction products, NCO terminated ethylene-propylene adipate prepolymers of various NCO contents were prepared and charged to a one gallon can and an NCO analysis made on the prepolymer. The prepolymer was then heated to 100° C. and glycerol alpha allyl ether was added to each of the prepolymers in such quantities as to prepare a crude having a desired NCO/OH ratio. After the resulting reaction product had been mixed for a ½ hour longer at 100° C. the desired amount of processing aid was mixed into each of the batches of crude for about 5 to 15 minutes. The molten crude product was then placed in coated (with a Dow Corning Silicone product DC–20) cans and the cans and their contents were then placed in ovens, set at 100–120° C. for 40–50 hours. The cured crudes were then removed from the ovens and allowed to age at room temperature for 24 hours prior to running the Mooney viscosity test procedures thereon. The size of each

EXAMPLE 2

Additional batches of urethane crudes were prepared as in Example 1, from prepolymers containing 3.0% —NCO at —NCO/OH ratios of 1.05 and 1.10. Various of the processing aids of the present invention were used to reduce the Mooney viscosity values of these crudes, which, without the processing aid therein would have Mooney viscosities of 200+. The crudes containing the processing aids were easy to process.

| Processing Aid Used | | —NCO/OH Ratio | Mooney Viscosity of Crude ML4, 212° F. Values |
|---|---|---|---|
| Acid | Amount, percent | | |
| Oleic | 0.5 | 1.05 | 54 |
| Palmitic | 0.5 | 1.05 | 32 |
| Stearic | 0.5 | 1.05 | 62 |
| Do | 1.0 | 1.05 | 40 |
| Do | 0.5 | 1.10 | 52 |
| Do | 1.0 | 1.10 | 34 |

We claim:

1. A urethane crude rubber composition having improved processing characteristics comprising an unmilled urethane crude rubber having incorporated therein a straight chained aliphatic fatty acid of about 6 to 25 carbon atoms, and where said rubber in the absence of said incorporated fatty acid has a Mooney viscosity value in excess of 120, and where said fatty acid is incorporated in said rubber during the preparation of said rubber, and said fatty acid being incorporated into said rubber in an amount proportionately equal to 0.1 to 2.0 parts by weight of fatty acid per 100 parts by weight or urethane crude rubber based upon a urethane crude rubber having an —NCO content of approximately 3%, said urethane crude rubber being the reaction product of an isocyanato terminated polyester prepolymer and glycerol alpha allyl ether.

2. A composition according to claim 1 wherein said fatty acid is incorporated in an amount of about 0.5 to 1.0 part by weight per 100 parts by weight of said rubber.

3. A composition according to claim 1 wherein said fatty acid is stearic acid.

4. A composition according to claim 1 wherein said fatty acid is oleic acid.

5. A composition according to claim 1 wherein said fatty acid is palmitic acid.

6. A composition according to claim 1 wherein said rubber polyester based rubber prepared from an —NCO terminated prepolymer having an —NCO content of approximately 3%.

7. A process for producing urethane crude rubber compositions having improved processing characteristics which comprises incorporating a straight chain aliphatic fatty acid of about 6 to 25 carbon atoms into an unmilled urethane crude rubber and where said fatty acid is incorporated into said rubber during the preparation of said rubber, and where said rubber in the absence of said incorporated fatty acid has a Mooney viscosity value in excess of 120, and where said fatty acid is incorporated into said rubber in an amount proportionately equal to 0.1 to 2.0 parts by weight of fatty acid per 100 parts by weight of urethane crude rubber based upon a urethane crude rubber having an —NCO content of approximately 3%, said urethane crude rubber being the reaction product of an isocyanato terminated polyester prepolymer and glycerol alpha allyl ether.

8. A process according to claim 7 wherein said fatty acid is incorporated into said rubber in an amount of about 0.5 to 1.0 part by weight per 100 parts by weight of said rubber.

9. A process according to claim 7 wherein said fatty acid is stearic acid.

10. A process according to claim 7 wherein said fatty acid is oleic acid.

11. A process according to claim 7 wherein said fatty acid is palmitic acid.

References Cited

UNITED STATES PATENTS

| | | | |
|---|---|---|---|
| 2,333,922 | 11/1943 | Foster | 260—22 |
| 2,844,554 | 7/1958 | Nichols et al. | 260—22 |
| 2,872,430 | 2/1959 | Parker et al. | 260—22 |
| 3,015,636 | 1/1962 | Elmer | 260—18 |
| 3,115,481 | 12/1963 | Pigott et al. | 260—18 |
| 3,130,175 | 4/1964 | Peter et al. | 260—18 |
| 3,227,663 | 1/1966 | Klesper et al. | 260—22 |

FOREIGN PATENTS 852,379  10/1960  Great Britain.

DONALD E. CZAJA, *Primary Examiner.*

R. W. GRIFFIN, *Assistant Examiner.*